United States Patent
Jones et al.

(10) Patent No.: US 9,550,315 B2
(45) Date of Patent: Jan. 24, 2017

(54) DELIVERING LIQUID ADDITIVE

(75) Inventors: Brian Jones, Merseyside (GB); Keith Bell, Cleveland, OH (US); Andrew Stuart Overend, Bolton (GB); Mark Frost, Derbyshire (GB)

(73) Assignee: COLORMATRIX HOLDINGS, INC., Wilmington, DE (US)

( * ) Notice: Subject to any disclaimer, the term of this patent is extended or adjusted under 35 U.S.C. 154(b) by 1057 days.

(21) Appl. No.: 13/263,298

(22) PCT Filed: Mar. 26, 2010

(86) PCT No.: PCT/GB2010/050515
§ 371 (c)(1),
(2), (4) Date: Feb. 1, 2012

(87) PCT Pub. No.: WO2010/116161
PCT Pub. Date: Oct. 14, 2010

(65) Prior Publication Data
US 2012/0138187 A1   Jun. 7, 2012

Related U.S. Application Data

(60) Provisional application No. 61/166,964, filed on Apr. 6, 2009.

(51) Int. Cl.
| | |
|---|---|
| *B29C 31/10* | (2006.01) |
| *B01F 3/12* | (2006.01) |
| *B01F 11/02* | (2006.01) |
| *B29B 7/94* | (2006.01) |
| *B29K 105/00* | (2006.01) |

(52) U.S. Cl.
CPC .............. *B29C 31/10* (2013.01); *B01F 3/1242* (2013.01); *B01F 11/0266* (2013.01); *B29B 7/94* (2013.01); *B29K 2105/0005* (2013.01)

(58) Field of Classification Search
CPC . B01F 3/1242; B01F 11/0042; B01F 11/0266; B29C 31/10; B29B 7/94
USPC ............. 366/76.1, 76.2, 76.6, 108, 110–114; 222/161
See application file for complete search history.

(56) References Cited

U.S. PATENT DOCUMENTS

| | | | |
|---|---|---|---|
| 4,522,397 A | 6/1985 | Miller, Jr. et al. | |
| 2002/0014496 A1 | 2/2002 | Cline et al. | |
| 2005/0267628 A1* | 12/2005 | Crowder et al. | ............. 222/161 |
| 2007/0140045 A1* | 6/2007 | Becht et al. | ............... 366/160.4 |

FOREIGN PATENT DOCUMENTS

| | | |
|---|---|---|
| DE | 202005015569 U1 | 3/2006 |
| EP | 0965423 A2 | 12/1999 |
| GB | 985998 | 3/1965 |
| WO | 03035346 A1 | 5/2003 |
| WO | 2008078075 A2 | 7/2008 |

\* cited by examiner

*Primary Examiner* — Timothy Cleveland
(74) *Attorney, Agent, or Firm* — Fay Sharpe LLP

(57) ABSTRACT

A reservoir assembly (40) comprises a container (4), a support assembly (42) on which the container (4) is mounted and fixed and a rotary electric vibrator device (44) coupled to the support assembly (42). The container holds a shear thinning additive for a plastics material. The reservoir assembly is arranged so that on operation of the device (44), an appropriate frequency and amplitude of vibration is applied to the container (4) and, therefore, its contents. As a result, a liquid dispersion in the container is shear thinned and recovery of dispersion from the container is increased.

20 Claims, 2 Drawing Sheets

DELIVERING LIQUID ADDITIVE

This application is a National Stage Entry of PCT/GB2010/050515, filed Mar. 26, 2010, and claims priority from U.S. Provisional Application Ser. No. 61/166,964, filed Apr. 6, 2009.

This invention relates to delivering liquid additive and methods and apparatus relating thereto. Preferred embodiments relate to delivering liquid colorant into a plastics material.

It is known to use liquid colorants to colour plastics material. Typically, this is achieved by accurately dosing liquid colorants into a premixer of plastics forming equipment, such as an injection moulder or an extruder. One example of such a system is described in European patent application No. 99304839.6 (publication no. 0965423) in which a dosing pump draws liquid colorant from vertically displaced collapsible reservoirs and delivers it to a premixer. Another example of a known system is described in WO03/035346.

WO2008/078075 describes a further known system which comprises a receptacle which may be supplied by a manufacturer of liquid colorants which is arranged to be operatively connected to a downstream reservoir from which fluid is controllably withdrawn for dosing into plastics material.

Liquid additive or colorants generally comprise liquid dispersions which are formulated to have a high low shear viscosity which advantageously reduces the rate of sedimentation of solids contained in the dispersions on storage and hence confers increased product shelf (storage) stability. Any solid sedimentation during storage of the product leads to stratification of the solid actives (colorants and/or additives) within the delivery container, which without any rehomogenisation would lead to problems in achieving consistent dosing of colour and/or additives.

Disadvantageously, a high low-shear viscosity that is essential for good product shelf stability can cause large variations in percentage product recovery from conventional packaging/dosing systems and consequently an operator may need to manually intervene to scrape the remaining product from a package so as to consistently achieve 96 wt % or more recovery.

It is an object of the present invention to address the aforementioned problems.

It is an object of the present invention to improve recovery rate of liquid additives from receptacles.

According to a first aspect of the invention, there is provided a method of delivering a liquid additive to an apparatus for delivering liquid additive into a plastics material, the method comprising:

(i) providing a liquid additive which is shear thinning in a receptacle; and (ii) with the receptacle operatively connected to an apparatus for delivering liquid additive into a plastics material, applying vibrational motion to the receptacle to facilitate passage of the liquid additive from the receptacle into said apparatus.

Said liquid additive suitably comprises a vehicle and an active component which it is desired to introduce into a plastics material. The active component could be solubilised in said vehicle. However, preferably the active component is provided as a dispersion in said vehicle. Thus, the active component is preferably generally insoluble in said vehicle.

Said liquid additive may include 15-99 wt %, suitably 20-95 wt %, preferably 30-85 wt %, more preferably 30-70 wt %, especially 40-60 wt % of said vehicle.

Said liquid additive may include 1-85 wt %, suitably 5-80 wt %, preferably 15-70 wt %, more preferably 30-70 wt %, especially 40-60 wt % of said active component.

The total wt % of all dispersed solids in said vehicle may be 1-85 wt %, suitably 5-80 wt %, preferably 15-70 wt %, more preferably 30-70 wt %, especially 40-70 wt % of solids.

The active component may be arranged to adjust a property of a plastics material into which it may be delivered. Said active material may be any material that it is desired to introduce into a plastics material and includes colorants, UV filters, oxygen absorbers, antimicrobial agents, acetaldehyde scavengers, reheat additives, antioxidants, light stabilizers, optical brighteners, processing stabilizers and flame retardants. Colorants may comprise pigments or dyes.

A preferred acetaldehyde scavenger is anthranilamide. A preferred reheat additive is titanium nitride.

Said additive is preferably a colorant. Thus, said liquid additive preferably comprises a liquid colorant. A colorant can be a pigment, a dye, a combination of pigments, a combination of dyes, a combination of pigments and dye, a combination of pigment and dyes, or a combination of pigments and dyes. The choice of colorants depends on the ultimate colour desired by the designer for the plastics material. The science of colour is well known to those skilled in the art.

Colorants are commercially available from a number of sources well known to those skilled in the art. Commercially available pigments are well known to those skilled in the art and include organic and inorganic colorant chemistries. Commercially available dyes are well known to those skilled in the art and include all organic chemistries. Commercial sources for pigments and dyes include multinational companies such as BASF, Lanxess, Ciba, Color-Chem International, Sun Chemical, Zhuhai Skyhigh Chemicals.

Said vehicle is preferably a liquid vehicle. Illustrative liquid vehicles include but are not limited to: mineral oils, $C_9$-$C_{22}$ fatty acid esters, ethoxylated $C_9$-$C_{22}$ fatty acid esters, ethoxylated alcohols and plasticizers. Plasticizers may for example be sebacates and azelates, such as dibutyl sebacate, esters such as benzyl benzoate, adipates such as dioctyladipate, citrates such as triethyl citrate, epoxies, phosphate esters such as 2-ethylhexyl diphenyl phosphate, phthalates such as dioctylphthalate, and secondary plasticisers such as chlorinated paraffins The method may be of particular utility for liquid additives which include one or more active components having a relatively large median particle diameter, for example having a 5 µm or greater median particle diameter, greater than 20 µm or greater than 100 µm. As used herein, a $d_{50}$ particle size is the median diameter, where 50% of the volume is composed of particles larger than the stated $d_{50}$, and 50% of the volume is composed of particles smaller than the stated $d_{50}$ value. As used herein, the median particle size is the same as the $d_{50}$ particle size.

Said liquid additive may have a viscosity, measured using a Brookfield Viscometer at 2 rpm and 23° C., of greater than 20,000 cP, greater than 40,000 cP, greater than 60,000 cP or greater than 80,000 cP.

Said liquid additive may have a viscosity, measured using a Brookfield Viscometer at 20 rpm and 23° C., of less than 300,000 cP, less than 200,000 cP or less than 100,000 cP.

As described, said liquid additive is suitably shear thinning. The additive may have a shear thinning index (STI) measured as described hereinafter of at least 1.5, preferably at least 2, more preferably at least 2.5. The STI may be less than 25, preferably less than 15, more preferably less than 10.

Preferably, vibrational motion is supplied to the receptacle from a vibrational device. The vibrational device may have an operating frequency of 0.1 Hz to 1000 Hz, preferably 1 Hz to 500 Hz, more preferably 10 to 200 Hz.

In some embodiments, the said vibrational device may be designed to operate at ultrasonic vibrational frequencies.

Said vibrational device may generate a peak-peak displacement amplitude on a base of the receptacle (which base include an outlet for passage of liquid additive out of the receptacle) of 0.01 mm to 10 mm, preferably 0.05 mm to 6 mm, more preferably 0.1 to 3 mm.

Said vibrational device may be arranged to impart a shearing action on liquid in the receptacle.

A said shearing action may be imparted in any linear or rotational direction, with the latter being preferred.

The axis of rotation of the vibrational device is preferably substantially vertical.

Said vibrational device may be pneumatically or electrically operable.

Said receptacle is preferably a part of a receptacle assembly which includes said vibration device for applying vibrational motion to the receptacle. Said receptacle assembly preferably comprises a receptacle and a support means therefor, wherein said vibration device is operatively connected to the support means. The support means may comprise a planar part on which a rim of the receptacle may be seated. The planar part may include an opening through which an outlet of the receptacle extends.

Securement means is preferably provided for securing the receptacle to the support means and/or so that the receptacle is translationally and rotationally fixed relative to the vibration device. Thus, preferably said receptacle does not rotate or otherwise move relative to the vibration device in use. Said securement means may be arranged to cooperate with a handle of the receptacle, for example a hand grip part thereof. Said handle may be arranged to be secured in position by a cam arrangement. Said securement means may additionally or alternatively be arranged to cooperate with an outlet of the receptacle, for example so that a latch or other locking arrangement releasably engages the outlet.

Said receptacle assembly, together with apparatus for delivering liquid additive into a plastics material, is preferably mounted on a movable support, for example a trolley, by means of which it may be moved towards and away from a plastics processing apparatus, for example an apparatus for melt processing for example extruding or injection moulding plastics material. The method may comprise selecting a plastics processing apparatus and moving a movable support, for example a trolley, on which said receptacle assembly is mounted from a position which is spaced from the plastics processing apparatus to a position wherein the movable support is adjacent the plastics processing apparatus.

Said receptacle may have a volume of at least 1 liter, suitably at least 5 liters, preferably at least 10 liters, more preferably at least 15 liters, especially at least 20 liters. The volume may be 100 liters or less, less than 35 liters or less than 30 liters. Said receptacle may include at least 1 kg or at least 10 kg of liquid additive. The amount of liquid additive may be less than 250 kg, less than 100 kg, less than 60 kg or less than 30 kg.

The method may use gravity, vacuum transfer or a pump means to extract liquid from the receptacle, with the latter being preferred. A said pump means may be a positive displacement pump for example a peristaltic pump.

Although vibrational motion as described can in some cases be applied to the receptacle continuously during emptying of the receptacle, it is found that intermittent operation can advantageously be used. In fact, if continuous vibration is used over extended periods, the rheology of the product may be disadvantageously affected. Thus, said vibrational motion is preferably operated intermittently. The vibrational motion may be supplied for periods of time of at least 5 seconds, 20 seconds or 1 minute. A delay of at least 3 minutes, 4 minutes, 5 minutes or 6 minutes may be defined between periods of supply of vibrational motion. In some cases the delay may be 1 hour, 2 hours, 3 hours or 4 hours. Where a receptacle is emptied very slowly, vibrational motion may be applied four times or less, three times or less or two times or less per day.

In some cases, the time from the start of emptying of said receptacle to the finish of emptying of said receptacle may be at least 2 hours, at least 4 hours or at least 6 hours. The time may be less than 12 hours or less than 10 hours.

The method may be used to remove at least 96 wt %, suitably at least 97 wt %, preferably at least 98 wt %, more preferably at least 99 wt % of liquid additive from the receptacle.

The method may comprise delivering liquid additive from said receptacle into a reservoir of said apparatus, for example a reservoir as described in WO2008/078075, the content of which is incorporated herein by reference. The reservoir may be operatively connected to a dosing pump which is arranged to deliver liquid into a plastics material so it can be mixed therewith. For example, said dosing pump may be arranged to deliver liquid to a premixer stage of plastics forming equipment, for example an injection moulder or extruder.

In a preferred embodiment, said liquid additive is for a thermoplastics polymer. Illustrative thermoplastic polymers include, but are not limited to, polyolefins, polyesters (such as those derived from ethylene glycols and terephthalic acids, more particularly PET, PBT and PETG), polycarbonate, polymethylmethacrylates, polyalkylacrylates, PVC, ABS, polystyrene, styrene copolymers. The method may comprise dosing liquid additive into a said thermoplastic polymer.

According to a second aspect of the invention, there is provided use of a vibration device for applying vibrational motion to a receptacle which contains a shear thinning liquid additive to facilitate passage of the liquid additive from the receptacle to an apparatus for delivering liquid additive into a plastics material.

According to a third aspect of the invention, there is provided an assembly comprising apparatus for delivering a liquid additive into a plastics material in combination with a receptacle for containing a shear thinning liquid additive, the assembly comprising a vibration device for applying vibrational motion to the receptacle to facilitate passage of liquid additive from the receptacle into said apparatus.

Said assembly is preferably movable. Said assembly preferably includes a movable support. Said assembly is preferably arranged to be rolled between first and second positions. Said assembly preferably includes wheels or rollers.

Said receptacle is preferably arranged to deliver liquid additive into a reservoir of said apparatus. Said apparatus preferably include a dosing device, downstream of said reservoir, for dosing liquid additive into a plastics material.

Said receptacle is preferably releasably securable adjacent said apparatus. It may be disengaged from said assembly.

Said receptacle preferably includes a handle and said handle is preferably arranged to engage a part of said assembly for releasably securing the receptacle in position. For example, the handle, for example a hand grip part thereof, may act as an cam follower and engage a cam surface which is part of the assembly.

Said receptacle may include an outlet for passage of liquid additive out of the receptacle, wherein said outlet includes a neck portion. Said assembly preferably includes means for releasably engaging the neck portion for releasably securing the receptacle in position. Said means for releasably engaging may be pivotable between engaging and non-engaging positions. It may include means arranged to extend into an annular gap defined in the neck portion. It may comprise a plate arranged to extend into said annular gap.

Preferably, said receptacle is arranged to be releasably secured in position by engagement of both its handle with part of the assembly and engagement of the neck portion as aforesaid.

Said assembly may include a receptacle which contains liquid additive, for example liquid colorant.

Said assembly may be operatively connected to plastics forming equipment.

Any feature of any aspect of any invention or embodiment described herein may be combined with any feature of any aspect of any other invention or embodiment described herein mutatis mutandis.

Specific embodiments of the invention will now be described, by way of example, with reference to the accompanying drawings, in which FIG. 1 is a schematic representation of a dosing apparatus;

Figure 1:
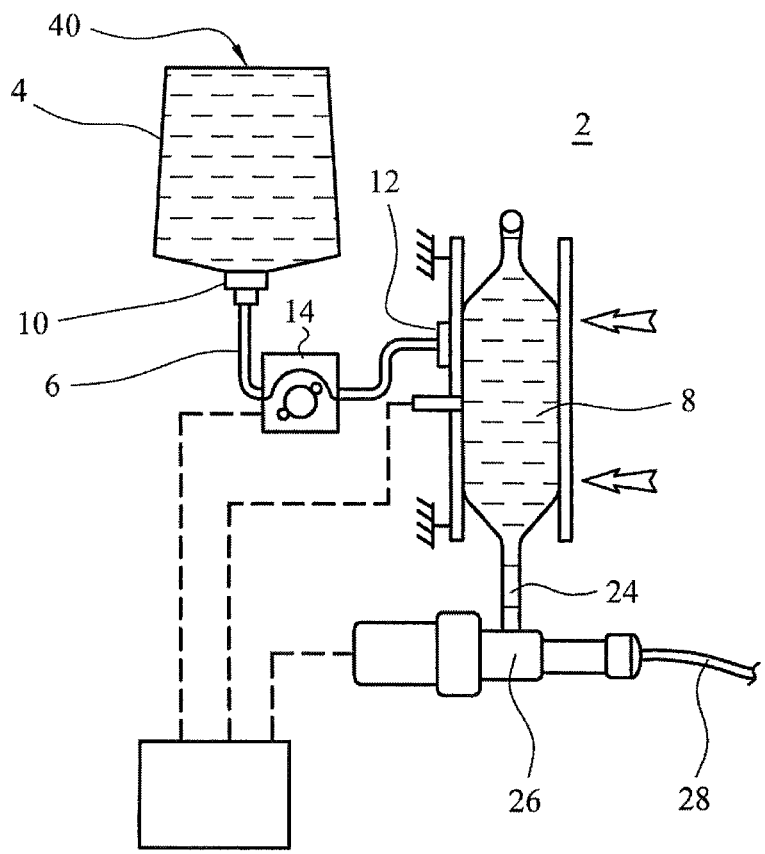

Referring to FIG. 1, a dosing apparatus 2 includes a main additive reservoir assembly 40 described in greater detail with reference to FIGS. 2 and 3, comprising a substantially rigid container 4 which is connected via pipe 6 to an intermediate reservoir 8. The pipe 6 is connected to the container 4 by a dry disconnect valve 10 and is connected to intermediate reservoir 8 via a simple screw-threaded coupling 12. A peristaltic pump 14 cooperates with pipe 6 for pumping fluid from the container 4 to the reservoir 8.

The reservoir 8 comprises a plastics bag which incorporates an opening (not shown) towards an upper end for communication with pipe 6. At its lower end, the reservoir 8 includes an outlet tube 24 which is arranged to deliver fluid to a dosing pump 26.

The dosing pump 26 is arranged to deliver a predetermined quantity of fluid into a process via pipe 28 which may be manipulated to deliver fluid, in the form of liquid colorant, into a plastics material.

Figure 2:
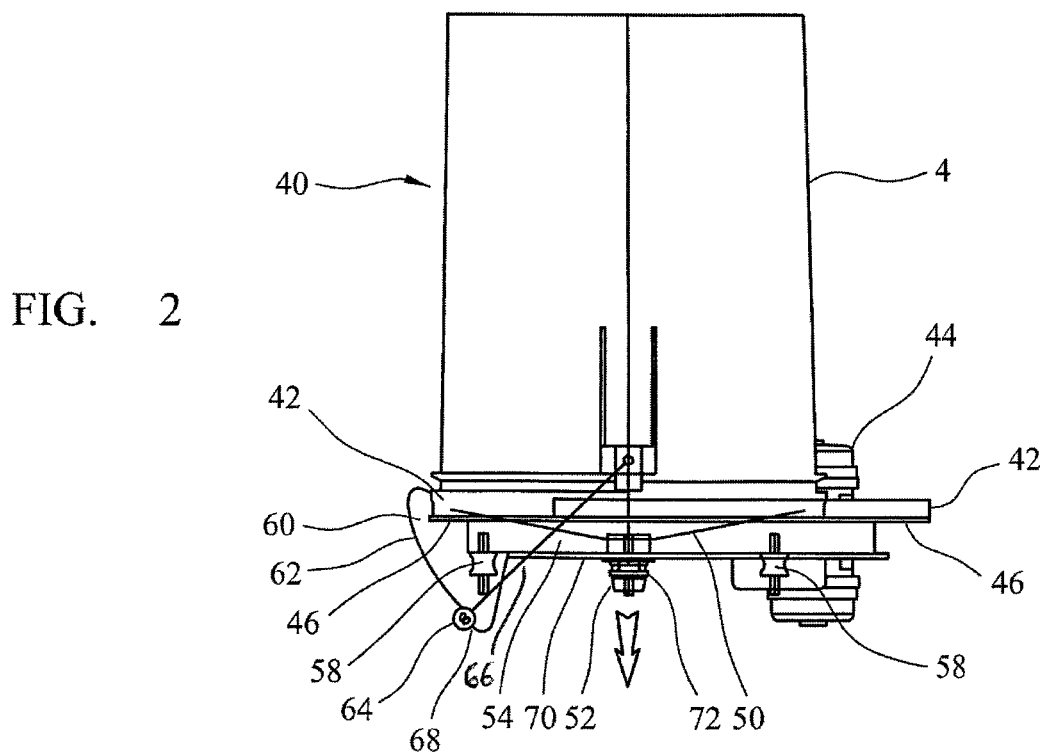
FIG. 2 is a side elevation of a reservoir assembly.
Figure 3:
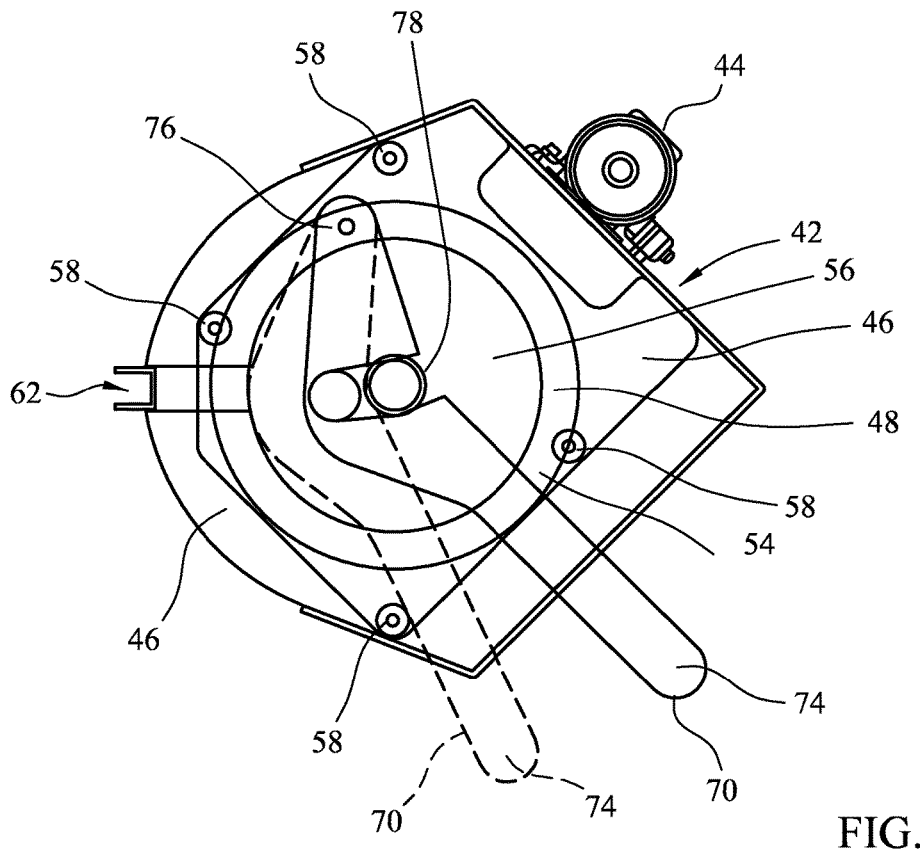
FIG. 3 is a plan view of a support assembly for supporting a container of the reservoir assembly, partly in cross-section.

Referring to FIG. 2, the reservoir assembly 40 comprises the container 4, a support assembly 42 on which the container 4 is mounted and fixed and a rotary electric vibrator device 44 (a Itlvibras M3/20-so2) coupled to the support assembly 42. The reservoir assembly is arranged so that on operation of the device 44, an appropriate frequency and amplitude of vibration is applied to the container 4 and, therefore, its contents. As a result, a liquid dispersion in the container is shear thinned and recovery of dispersion from the container is increased.

Further details and examples are provided below.

The support assembly 42 is arranged to support the weight of container 4. It comprises a planar horizontal platform 46 made from a sheet material (FIG. 3) which surrounds and defines a circular opening 48. A circular rim of the inverted container 4 rests upon and is supported by platform 46. A conical region 50 of the container 4 extends downwardly through opening 48 so that the container's outlet 52 is positioned centrally within the opening 48 below platform 46.

Stepped beneath platform 46, the support assembly includes a planar support plate 54 which is rigidly secured to the platform 46 by means (not shown) such that the platform 46 and support plate 54 extend parallel to one another. The support plate 54 includes a circular opening 56 which is concentric with the circular opening 48 although opening 56 is of smaller diameter. The support plate 56 is secured to a frame (not shown) of a trolley (not shown) which carries other elements of the apparatus shown in FIG. 1, by means of four isolation mounts 58.

The device 44 is rigidly secured to both the platform 46 and support plate 54 by suitable means (not shown) so that vibrations from the device 44 are transmitted in use to the platform and support plate and, therefore, the container 4 supported on the platform.

The container 4 is rigidly secured to the support assembly 42 in use. To this end, a cam arrangement 60 is provided. The arrangement 60 has a curved surface 62 which extends downwardly, curves inwardly and is aligned with a diameter which is concentric with the circular openings 48, 56. The curved surface is arranged to be engaged by a hand grip portion 64 of a pivotable handle 66 of the container 4 so portion 64 rests within a depression 68 in the surface 62 when suitably positioned. In addition, a catch arrangement 70 is provided to engage discharge connector 72 of the container 4. More particularly, the catch arrangement comprises a planar dog-legged member 74, made of sheet steel, which is pivotably mounted at point 76 on an upwardly facing face of support plate 54 so that it is pivotable between a disengaged position shown in dashed lines in FIG. 3 and an engaged position shown in full lines in FIG. 3. The dog-legged member 74 is positioned so that on pivoting of the member, a mouth 78 thereof moves towards the centre of the openings 48, 56 at which position discharge connector 72 is positioned in use. Thus, member 74 and discharge connecter 72 are arranged such that, in use, the mouth extends around the connector 72 and an area of member 74 around the mouth extends within an annular recess defined in the discharge connector.

The container 4 may be secured to the support assembly 42 as follows. With the dog-legged member 74 in the dashed position shown in FIG. 3, the container 4 with its lid in position, is inverted and positioned centrally within openings 48, 56 so that its rim makes face to face contact with platform 46. Then, the handle 60 of the container is pivoted and the hand grip portion 64 is engaged with and moved down surface 62 until it rests within the depression 68. Next, the dog-legged member 74 is pivoted so its mouth 78 extends around discharge connector 72 and the member 74 cooperates with the annular recess defined in the connector.

In use when the device 44 vibrates, vibration is transmitted to the platform 46, support plate 54 and container 44 so they move as one.

The reservoir assembly 40 may be used to provide a substantial improvement in recovery (yield) of a shear thinning liquid dispersion from the container 4.

A simple test to define whether a formulation is shear thinning is to measure its viscosity at two shear rates and at a temperature of 23° C. If the viscosity of the formulation at the low shear rate is greater than the viscosity at the high shear rate then it exhibits shear thinning rheological behaviour. A term called "shear thinning index", defined as the ratio of the low shear viscosity over the high shear viscosity, can be used to compare the shear thinning properties of the fluids. This can be simply determined by measuring the viscosity of the formulation using a Brookfield Viscometer at a low spindle speed (e.g. 2 rpm) and at a high spindle speed (e.g. 20 rpm) and determining the ratio according to the following equation:

$$\text{Shear Thinning Index } (STI) = \frac{\text{Viscosity at 2 rpm}}{\text{Viscosity at 20 rpm}}$$

Examples 1 to 6 illustrate operation of the reservoir assembly.

EXAMPLES 1 TO 6

A Brookfield DV-II+ programmable viscometer, model type RVDV-II+, utilizing a #6 spindle was used to measure the viscosity of each formulation at 5 rpm (low-shear rate) and 20 rpm (high-shear rate).

Seven liquid colour products from ColorMatrix Corporation, USA, with various viscosities and a range of shear thinning indices were chosen to illustrate the improved product recovery that can be achieved using the reservoir assembly 40.

Identical 27 liter containers were filled with 18.18 kg of liquid colour dispersions. Two respective containers were filled with each dispersion and the containers were emptied and assessed with and without operation of the vibrator device 44.

In a first series of experiment a peristaltic pump (e.g. pump 14 of FIG. 1) was used to pump dispersion from each container until no more product could be removed. Then the containers were weighed to determine the amount of dispersion remaining. In a second series of experiments, the pump was used as before except in this case the vibrator device was operated continuously. The operating frequency of the device was 50 Hz and the peak-peak displacement amplitude was 1.5 mm. After no more product could be removed from the container, the container was weighed to determine the amount of dispersion remaining. Results are provided in Table 1.

Figure 4:
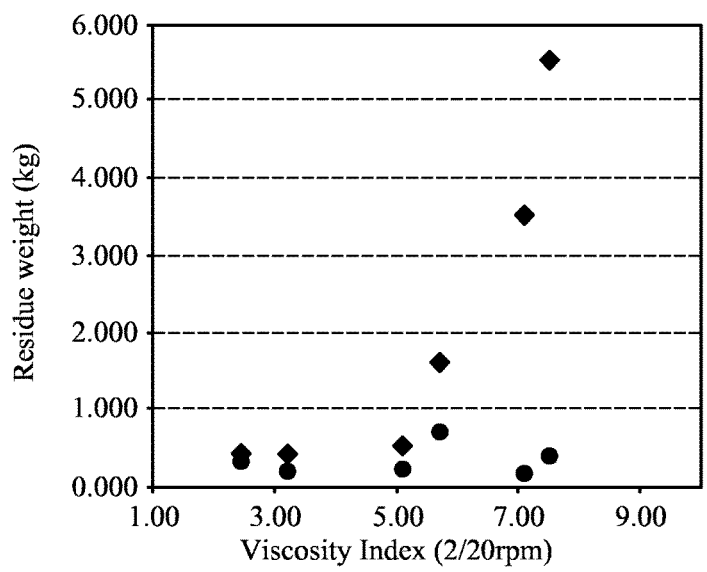
FIG. 4 is a graph of residual weights v. viscosity index for a range of colour dispersions with and without vibration.

The results for Table 1 are graphically represented in FIG. 4. It will be noted from the figure that the residual weight of liquid colorant remaining in the containers without vibration is high, particularly for high viscosity index formulations, whereas that remaining when vibration is used is consistently low.

The residual product remaining in the containers without vibration varies considerably from 414 g to 5.555 kg which equates to product recovery yields of 97.6% to 69.5% respectively.

With vibration, the residual product, in all cases is reduced, ranging from 173 g to 686 g which equates to product recovery yields of 99.1% to 96.2% respectively.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of facilitating emptying of a receptacle to improve recovery of a liquid additive composition from the receptacle, the method comprising:
   (i) selecting the receptacle containing the liquid additive composition which is shear thinning;
   (ii) releasably securing said receptacle adjacent to an apparatus for delivering the liquid additive composition into a plastics material;
   (iii) with the receptacle operatively connected to said apparatus for delivering the liquid additive composition into the plastics material, applying vibrational motion to the receptacle to facilitate passage of the liquid additive composition from the receptacle into said apparatus, wherein said vibrational motion is applied using a vibrational device having an operating frequency in the range of 1 Hz to 500 Hz; and
   (iv) delivering the liquid additive composition from the apparatus into the plastics material;
   wherein the liquid additive composition delivered in step (iv) is identical to the liquid additive composition contained in the receptacle selected in step (i).

2. A method according to claim 1, wherein said liquid additive composition comprises a vehicle and an active component which it is desired to introduce into a plastics material.

3. A method according to claim 1, wherein said liquid additive composition comprises a vehicle and an active component which is provided as a dispersion in said vehicle;

TABLE 1

| Example No | Density g/cm³ | Brookfield Viscosity (cP) | | Shear Thining Index (2/20 rpm) | Residual Product (kg) | | Residual Product (litre) | | % Yield | |
|---|---|---|---|---|---|---|---|---|---|---|
| | | 2 rpm | 20 rpm | | Without vibration | With vibration | Without vibration | With vibration | Without vibration | With vibration |
| 1 | 1.98 | 37000 | 15000 | 2.5 | 0.436 | 0.327 | 0.221 | 0.165 | 97.6% | 98.2% |
| 2 | 1.12 | 44500 | 13800 | 3.2 | 0.414 | 0.191 | 0.371 | 0.171 | 97.7% | 99.0% |
| 3 | 1.69 | 24500 | 4800 | 5.1 | 0.523 | 0.241 | 0.309 | 0.142 | 97.1% | 98.7% |
| 4 | 2.19 | 92000 | 16100 | 5.7 | 1.614 | 0.686 | 0.735 | 0.313 | 91.1% | 96.2% |
| 5 | 1.24 | 67500 | 9500 | 7.1 | 3.536 | 0.173 | 2.863 | 0.140 | 80.6% | 99.1% |
| 6 | 1.06 | 140000 | 18,600 | 7.5 | 5.555 | 0.368 | 5.252 | 0.348 | 69.5% | 98.0% | and wherein said active component is selected from colourants, UV filters, oxygen absorbers, antimicrobial agents, acetaldehyde scavengers, reheat additives, anti-oxidants, light stabilisers, optical brighteners, process for stabilizers and flame retardants.

4. A method according to claim 2, wherein said active component is a colourant; and wherein said vehicle is selected from $C_9$-$C_{22}$ fatty acid esters, ethoxylated $C_9$-$C_{22}$ fatty acid esters, ethoxylated alcohols and plasticizers.

5. A method according to claim 1, wherein said liquid additive composition has a viscosity of greater than 20,000 cP.

6. A method according to claim 1, wherein the liquid additive composition has a shear thinning index of at least 1.5.

7. A method according to claim 1, wherein said vibrational motion is applied using the vibrational device which generates a PEAK-PEAK displacement amplitude on a base of the receptacle of 0.01 mm to 10 mm.

8. A method according to claim 1, wherein said receptacle is part of a receptacle assembly which includes the vibrational device for applying vibrational motion to the receptacle, wherein said receptacle assembly comprises the receptacle and a support means therefor, wherein said vibrational device is operatively connected to the support means, and the support means comprises a planar part on which a rim of the receptacle is seated.

9. A method according to claim 8, wherein a securement means is provided for releasably securing the receptacle to the support means so that the receptacle is translationally and rotationally fixed relative to the vibrational device.

10. A method according to claim 9, wherein said securement means is arranged to co-operate with a handle of the receptacle and/or is arranged to co-operate with an outlet of the receptacle.

11. A method according to claim 8, wherein said receptacle assembly is mounted on a movable support by means of which it may be moved towards and away from a plastics processing apparatus.

12. A method according to claim 1, wherein said vibrational motion is operated intermittently while liquid additive composition is flowing during emptying of the receptacle.

13. A method according to claim 12, wherein said vibrational motion is supplied for periods of time of at least 20 seconds, with a delay of at least 6 minutes being defied between periods of supply of vibrational motion.

14. A method according to claim 1, wherein said liquid additive composition is for a thermoplastics polymer.

15. An assembly comprising apparatus for delivering a liquid additive into a plastics material in combination with a receptacle containing a shear thinning liquid additive, the assembly comprising a vibration device for applying vibrational motion to the receptacle to facilitate passage of liquid additive from the receptacle into said apparatus, wherein said receptacle is releasably securable adjacent the apparatus;

wherein said receptacle includes an outlet for passage of said liquid additive out of the receptacle, wherein said outlet includes a neck portion and said assembly includes means for releasably engaging the neck portion for releasably securing the receptacle in position.

16. A method according to claim 1, wherein said receptacle includes a handle.

17. A method according to claim 1, wherein the method is used to remove at least 97 wt % of liquid additive composition from the receptacle.

18. A method of facilitating emptying of a receptacle to improve recovery of a liquid additive composition from the receptacle, the method comprising:
(i) providing the liquid additive composition which is shear thinning the receptacle;
(ii) with the receptacle operatively connected to an apparatus for delivering the liquid additive composition into the plastics material, applying vibrational motion to the receptacle to facilitate passage of the liquid additive composition from the receptacle into said apparatus, wherein said vibrational motion is operated intermittently while liquid additive composition is flowing during emptying of the receptacle, wherein said vibrational motion is applied using a vibrational device having an operating frequency in the range of 1 Hz to 500 Hz; and
(iii) delivering the liquid additive composition from the apparatus into the plastics material;
wherein the liquid additive composition delivered in step (iii) is identical to the liquid additive composition provided in step (i); and
wherein said method is used to recover at least 98 wt % of liquid additive composition from said receptacle.

19. The method of claim 1, wherein the receptacle includes an outlet for passage of the liquid additive out of the receptacle; wherein the outlet includes a neck portion; and wherein an assembly comprising the receptacle and the apparatus further comprises:
the vibrational device for applying the vibrational motion; and
means for releasably engaging the neck portion for releasably securing the neck portion in position.

20. The method of claim 1, wherein said method is used to recover at least 98 wt % of liquid additive composition from said receptacle.

* * * * *